Sept. 10, 1957 E. O. SCHONSTEDT 2,805,482
STRAIN GAGE

Filed Sept. 29, 1955 2 Sheets-Sheet 1

INVENTOR
E. O. SCHONSTEDT

BY

ATTORNEYS

Sept. 10, 1957 E. O. SCHONSTEDT 2,805,482
STRAIN GAGE
Filed Sept. 29, 1955 2 Sheets-Sheet 2
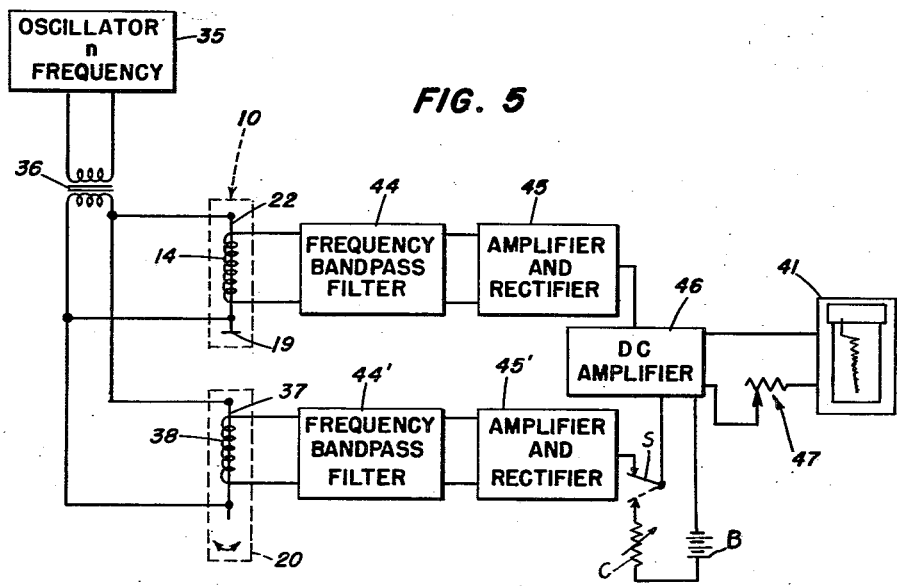
INVENTOR
E. O. SCHONSTEDT United States Patent Office 2,805,482
Patented Sept. 10, 1957

2,805,482

STRAIN GAGE

Erick O. Schonstedt, Silver Spring, Md.

Application September 29, 1955, Serial No. 537,600

11 Claims. (Cl. 33—148)

(Granted under Title 35, U. S. Code (1952), sec. 266)

The invention described herein may be manufactured and used by or for the Government of the United States of America for governmental purposes without payment of any royalties thereon or therefor.

The present invention relates to strain gages and more particularly to a strain gage for measuring strain in a test body due to the effects of torsion, elongation and pressure applied thereto.

There are numerous ways of measuring such strains or stress effects but the purpose of the apparatus of this invention is to measure relative motion, either torsional or longitudinal, resulting from such strains.

It is therefore a primary object of the present invention to provide a novel apparatus for the purpose set forth.

A further object of the invention is the provision of an improved device of a relatively simple nature for ascertaining the torsional or longitudinal stress effect of a test member.

Another object is to provide a measuring apparatus which includes a strain gage adapted to be clamped to a test member and which indicates the degree of change in the test member when the same is under strain.

A final object of the invention is the provision of a strain gage adapted to be clamped to a test member and which employs a wire of high magnetic permeability excited by an alternating current, the wire being torsioned due to relative changes in the test member when under strain to indicate the stress effect in the member through suitable means.

Other objects and many of the attendant advantages of this invention will be readily appreciated as the same becomes better understood by reference to the following detailed description when considered in connection with the accompanying drawings in which like reference numerals designate like parts throughout the figure thereof and wherein:

Fig. 4 is a diagrammatic view of a simple circuit illustrating the principle of operation of the invention; and Fig. 5 is a diagrammatic view of another circuit illustrating use of the strain gage in conjunction with sources of adjustable direct current.

Figure 1:
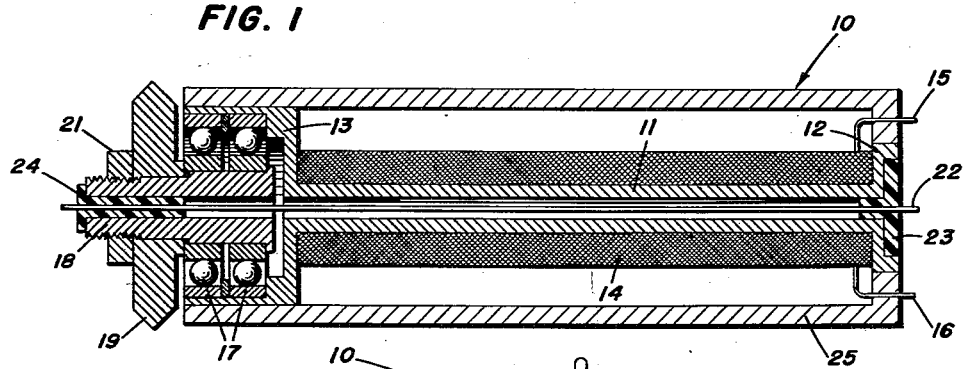
Fig. 1 is a front elevation in section of a preferred embodiment of the strain gage of this invention.

Referring now to the drawing, wherein like reference characters designate like or corresponding parts throughout the several views, there is shown in Fig. 1 a strain gage 10 comprising a tubular member 11 having enlargements or shoulders 12 and 13 at its ends. The tubular member and its enlargements form a coil and bearing support. Wound about the tubular member 11, between the enlargements thereof, is a coil 14 comprising several hundred turns of copper wire, the ends of the coil terminating in leads 15 and 16.

Enlargement 13 of the tubular member houses a pair of bearing means 17 which mount a hollow tubular shaft 18 coaxially of tubular member 11. Supported upon the shaft 18 is a wheel 19, the wheel being held upon the shaft by means of a nut 21, the shaft being suitably threaded to receive said nut.

Extending coaxially of member 11 and wheel 19 is a length of annealed wire 22 of high magnetic permeability, such as Permalloy wire or the like. One end of the wire is secured to enlargement 12 of member 11 by means of a clamp 23 of electrical insulating material, the other end of the wire being secured to shaft 18 by means of a clamp 24 to turn with wheel 19; clamp 24 also being made of electrical insulating material. Supported upon enlargements 12 and 13 of tubular member 11 is a soft iron case 25 which encloses the coil and provides a magnetic shield therefor.

Figure 2:
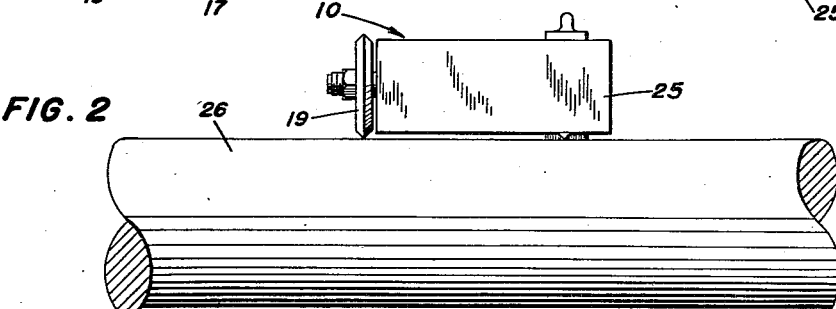
Fig. 2 is a front elevation and shows an application of the strain gage to a test member for measuring torsional strain in said member.
Figure 3:
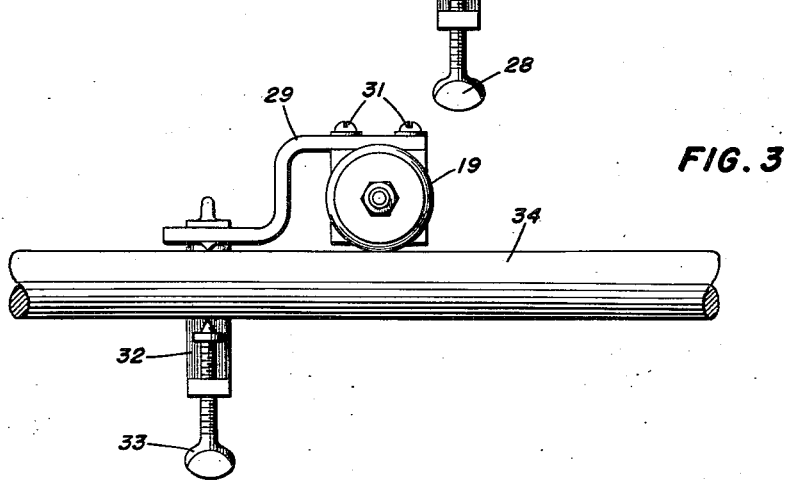
Fig. 3 is a side elevation and shows an application of the strain gage to a test member for measuring longitudinal strain in the member.

Fig. 2 shows an application of the strain gage 10 described above to a cylindrical test member 26 to measure torsional strain therein. The strain gage is secured to the test member by a metal clamp in the nature of a C-clamp 27 to dispose the strain gage with wire 22 thereof parallel to the longitudinal axis of the test member; the C-clamp having a thumb screw 28. To apply the strain gage to a test member 34 for measuring longitudinal stress therein, use is made of a bracket 29 secured to the strain gage by screws 31, Fig. 3. The bracket is secured to test member 34 by a clamp 32 having a thumb screw 33 so that wire 22 of the strain gage extends transversely of the longitudinal axis of the test member.

The basic operation of this invention may be best understood by reference to Fig. 4 wherein is shown a simple circuit having an oscillator 35 of any desired frequency, such, for example, as frequency $n$. Oscillator 35 is connected to the primary of a transformer 36, the secondary of the transformer being connected to a length of annealed wire 37 of high magnetic permeability, such as Permalloy wire or the like. Wound about this wire is a coil 38 which is connected through a filter and amplifier 39 to suitable indicating means 41 which may be graphic or visible, as desired. Wire 37 and coil 38, and suitable means to twist the wire, comprise an adjustable torsional device 20. Torsional stress induced in the wire 37, as by slightly twisting the same, causes a coupling between the wire and coil 38 and generates a signal of the excitation frequency in the coil. This signal is a function of the torsional stress in the wire, and the phase of this signal will lead or lag some phase reference 90 degrees, depending upon whether the torsion is right or left. The filter portion of the filter and amplifier 39 inserted in the coil circuit, allows signals of only the excitation frequency to pass; harmonic signals will be generated also if there is a magnetic field along the axis of the wire and these harmonic signals, of course, are not desired. After the filter, the signal of the excitation frequency is amplified and recorded by suitable means 41.

In Fig. 5 is shown a measuring apparatus which incorporates the strain gage of this invention. This apparatus, in one arrangement thereof, comprises an oscillator 35 of any frequency, such as $n$ frequency, which is connected in parallel with a pair of wires 22 and 37 through a transformer 36. Wire 22 is a part of a strain gage 10, which is similar to the strain gage described above, and has a wheel 19 similar to the wheel 19 of the above described strain gage.

Surrounding wire 22 is a coil 14, similar to coil 14 described above; the ends of the coil being connected to a frequency bandpass filter 44 which in turn is connected to an amplifier rectifier 45.

Wire 37 forms a part of an adjustable torsion device 20, the wire being adapted to be twisted slightly by suitable adjustable means. Wound about wire 37 is coil 38 the ends of which are connected to a frequency bandpass filter 44', the filter in turn being connected to an amplifier rectifier 45', connected to a D. C. amplifier 46 through a switch S. The outputs of the strain gage 10 and adjustable torsion device 20 are thus amplified and rectified to give opposing direct currents or D. C. voltages which are fed to the D. C. amplifier 46. The D. C. amplifier 46 is connected through a sensitivity control 47 to a recorder or indicating means 41 and the unbalance between the two direct currents is in this way amplified and recorded or indicated. Initially, the strain gage 10 is mounted with a torsional stress in wire 22. Wire 37 of the adjustable torsion device 20 is then adjusted to balance the D. C. signal supplied to the D. C. amplifier 46 by the strain gage 10 by twisting wire 37 in the proper direction. This adjustment is necessary to neutralize the initial torsional stress in the wire of the strain gage. Variations in the strain gage output due to strains in the test member unbalance the D. C. amplifier so as to provide strain indications on the recorder and with a zero center recorder, both tension and compression strains could be indicated.

The hereinbefore described arrangement of Fig. 5 may be modified by omitting the adjustable torsion device 20 and bringing the leads from transformer 36 directly into the filter 44'. Suitable means would be provided between amplifier rectifier 45' and D. C. amplifier 46 to adjust the direct current. A further modification would be to employ in place of the adjustable torsion device portion of the circuit an adjustable direct current source such as a battery B connected to the D. C. amplifier 46 through switch S and suitable current adjusting means C. In other words, when switch S is thrown to the dotted line position shown in Fig. 5, the leads from the secondary of the transformer 36 would, in effect, be connected only to the ends of wire 22; elements 37, 38, 44' and 45' of the circuit being effectively replaced by the battery and current adjusting means.

Applicant has thus provided apparatus for measuring strain in a test member due to torsion or change in length which takes advantage of relative change in the test member to induce torsional stress in the wire of the strain gage; the change in said torsional stress varying the output of electrical equipment to indicate the extent of the strain in the test member.

Various modifications are contemplated and may obviously be resorted to by those skilled in the art without departing from the spirit and scope of the invention, such, for example, as by employing the invention in the structure of a fluid pressure gage.

What is claimed and desired to be protected by Letters Patent of the United States is:

1. In a device of the character disclosed, a tubular support, a coil wound about said support, an annealed wire of high magnetic permeability disposed coaxially within said support and extending the length thereof, one end of said wire being clamped to one end of the support by an electrically insulated means, a wheel journaled in the other end of said support supporting coaxially thereof, the other end of said wire extending coaxially of said wheel and clamped thereto, a magnetic shield surrounding the coil and support and carried by said support with the wheel outside the shield at one end thereof, and clamp means secured to said shield for attaching said device to a test specimen and establishing contact of said wheel therewith, said wheel being adapted to be rotated by strain in the specimen.

2. A device as in claim 1 wherein said wire is composed of Permalloy.

3. A device as in claim 1 in which said clamp means comprises a C-clamp secured to one end of said shield adjacent the end thereof opposite said wheel; whereby the device may be clamped to a cylindrical test object with the wheel in contact therewith and the wire disposed parallel to the longitudinal axis of the test object.

4. A device as in claim 1 in which said clamp means comprises a C-clamp and a bracket between said clamp and shield; whereby the device may be clamped to a cylindrical test object with the wheel in contact therewith and the wire extending transversely of the longitudinal axis of the test object.

5. In a device of the character disclosed, a tubular support, a wheel journaled coaxially in one end of said support, an annealed wire of high magnetic permeability extending through said support and wheel coaxially thereof, one end of said wire being fixed to said wheel to turn therewith, the other end of said wire being fixed to the other end of said support, and means for clamping the support to a cylindrical test member with said wheel contacting the member, said wheel being adapted to be rotated by strain in the member.

6. A device as in claim 5 wherein the last-named means is of a character to dispose said wire parallel to the axis of the test member and the wheel in contact with the test member.

7. A device as in claim 5 wherein the last-named means is of a character to dispose said wire transversely of the test member and the wheel in contact with the test member.

8. A device as in claim 5 in which the wire is composed of Permalloy.

9. An apparatus of the class disclosed comprising a strain gage adapted to be secured to a test object in which the strain is to be measured, said strain gage comprising a length of annealed wire of high magnetic permeability, one end of said wire being fixed means operatively connecting the other end of said wire to said test object for torsionally stressing said wire by changes in the test object due to strain, an oscillatory circuit connected to the wire for causing excitation of the wire at a desired frequency, a coil surrounding said wire, coupling between the wire and coil occurring as a result of torsionally stressing said wire and generating a signal of the excitation frequency in the coil, said signal being a function of the torsional stress in the wire, a filter connected to the coil which allows only signals of the excitation frequency to pass, said filter being connected to an amplifier rectifier; whereby the output of the strain gage is converted to a direct current, said amplifier rectifier being connected to a direct current amplifier receiving said direct current and amplifying the same, and recording means connected to the direct current amplifier for indicating the strain in the test object, and a source of adjustable direct current connected to said direct current amplifier and feeding into the same a direct current in opposition to the direct current of the strain gage, said adjustable current serving to balance initially the direct current of the strain gage and thereby establish a reference on said recording means, variation in the direct current output of the strain gage due to strain in the test object unbalancing the adjusted relation between the direct currents and thereby causing the recording means to indicate the strain in the test object.

10. An apparatus as in claim 9 in which said source of adjustable direct current comprises a battery electrically connected to said direct current amplifier.

11. An apparatus as in claim 9 in which said source of adjustable current includes a torsionally adjustable wire connected to said oscillatory circuit in parallel with the wire of said strain gage, a coil surrounding said adjustable wire, and a filter connected to said last-named coil and to an amplifier rectifier, said last-named filter and amplifier rectifier being connected in parallel to said direct current amplifier for feeding direct current to the same, adjustment of said adjustable wire serving to balance initially the direct current output of the strain gage.

References Cited in the file of this patent

UNITED STATES PATENTS

| | | |
|---|---|---|
| 2,016,978 | Thomas | Oct. 8, 1935 |
| 2,058,518 | Schuster | Oct. 27, 1936 |
| 2,073,394 | MacMillan | Mar. 9, 1937 |
| 2,292,326 | Lewis | Aug. 4, 1942 |
| 2,511,178 | Roters | June 13, 1950 |